Figure 1:
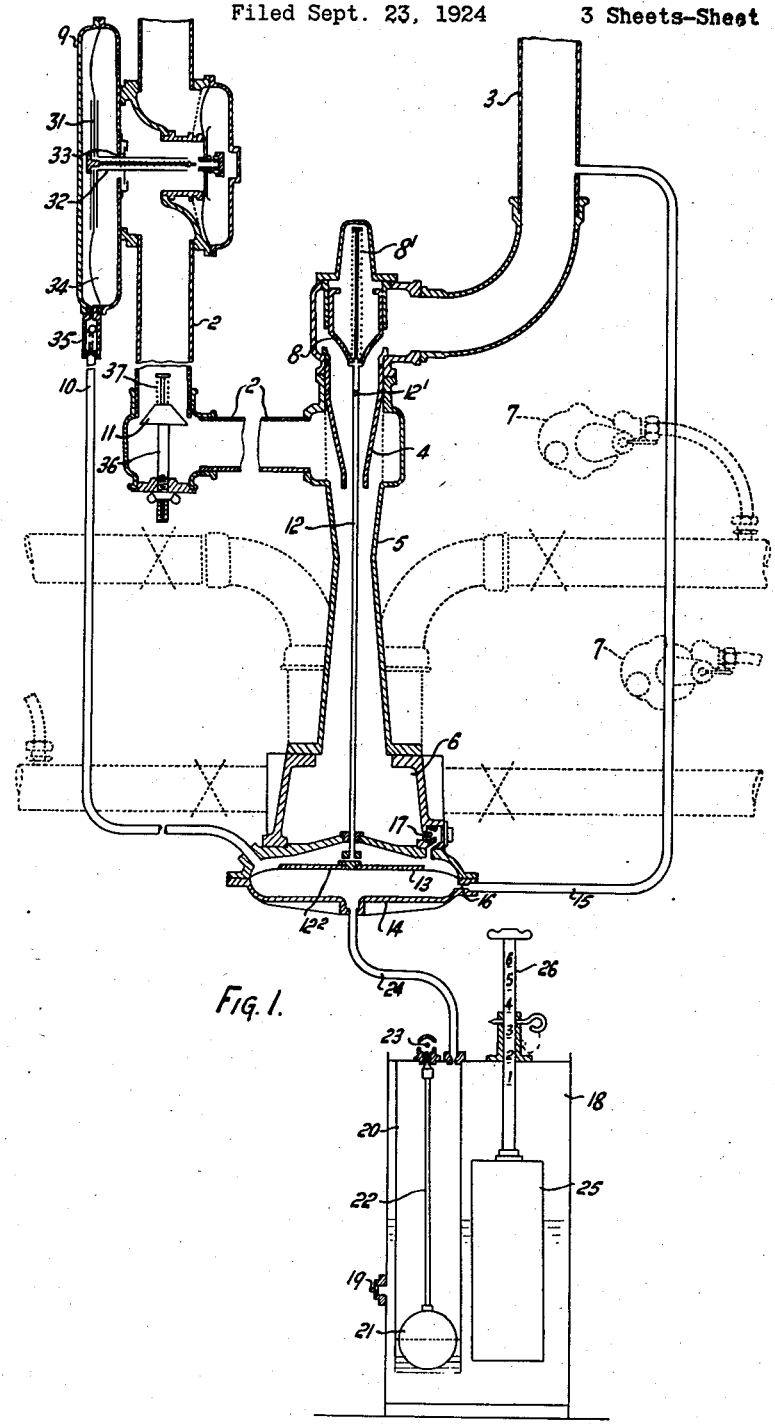

July 6, 1926.

G. KEITH 1,591,324

GAS AND AIR MIXING APPARATUS

Filed Sept. 23, 1924     3 Sheets-Sheet 1

Inventor
George Keith
By
Pennie, Davis, Marvin & Edmonds
Attorneys

July 6, 1926.
G. KEITH
GAS AND AIR MIXING APPARATUS
Filed Sept. 23, 1924
1,591,324
3 Sheets-Sheet 2
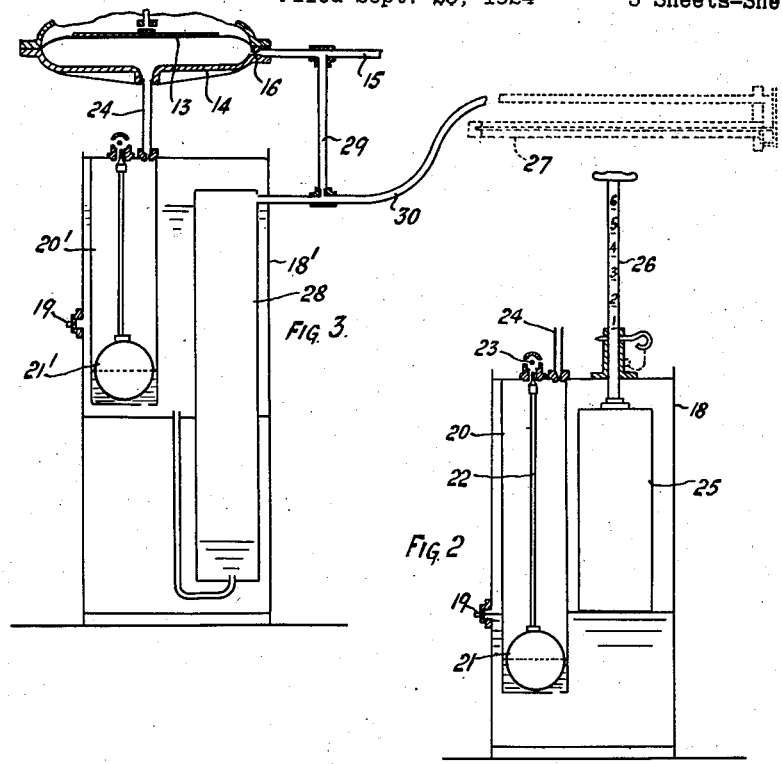
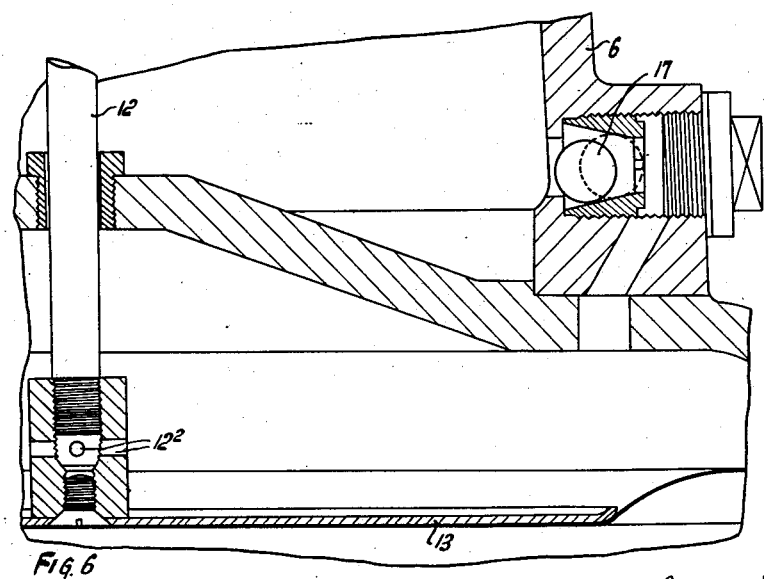
Inventor
George Keith
By
Pennie, Davis, Marvin & Edmonds
Attorneys July 6, 1926.

G. KEITH 1,591,324

GAS AND AIR MIXING APPARATUS

Filed Sept. 23, 1924

3 Sheets-Sheet 3

Patented July 6, 1926.

1,591,324

UNITED STATES PATENT OFFICE.

GEORGE KEITH, OF LONDON, ENGLAND, ASSIGNOR TO JAMES KEITH & BLACKMAN COMPANY, LIMITED, OF LONDON, ENGLAND, A BRITISH COMPANY.

GAS AND AIR MIXING APPARATUS.

Application filed September 23, 1924, Serial No. 739,346, and in Great Britain September 25, 1923.

This invention relates to gas and air mixing apparatus designed to meet the demand for the supply of a pre-formed self-burning mixture to a number of burners, as, for example, the burners of bread and biscuit gas-fired ovens.

Problems to be solved are the protection of the parts of the apparatus and its surroundings from risks of explosion and consequences of possible explosion due to backfiring, for example, and automatic regulation of the quality, quantity and pressure of the mixture to be supplied to the burners.

These problems are solved by the apparatus of the invention, as will hereinafter appear.

The gas may be from any source, it being understood that the optimum proportions of gas and air will depend on the quality of the gas.

The gas and air may both be compressed, in which event separate compressing means are employed, so that no explosion of mixture can take place in the compressing apparatus; desirably the pressures to which the two constituents of the mixture are brought exceed the pressure of the mixture.

The gas and air are led through pipes, one terminating in a nozzle and the other in a diffusion tube into which the nozzle opens. For the purpose of the present description we shall assume that the air is led to the nozzle and the gas to the tube.

The nozzle is arranged in alignment with the diffusion tube in which the air and gas are mixed and from which the mixture passes into a distribution chamber.

The admission of air to the nozzle is controlled by a valve, such as a piston valve, fitted to the compressed air supply pipe.

Between the compressed-gas-supply pipe and the diffusion tube is interposed a governor which serves to govern the pressure of the gas on its outlet side so that it is equal to the pressure set up in a pipe leading from the governor to a point subject to the pressure prevailing in the distribution chamber.

For transmitting movement to the piston valve there is connected thereto a rod which may extend through the diffusion tube and through the nozzle and which is connected to a controlling diaphragm or the like.

The controlling diaphragm is fitted within a chamber the underside of which has a tubular connection with the compressed air supply pipe, the air pressure acting on the underside of the diaphragm to hold the valve in raised, that is open, position.

The invention further provides means hereinafter described for effecting regulation of the air pressure acting on the diaphragm.

Figure 4:
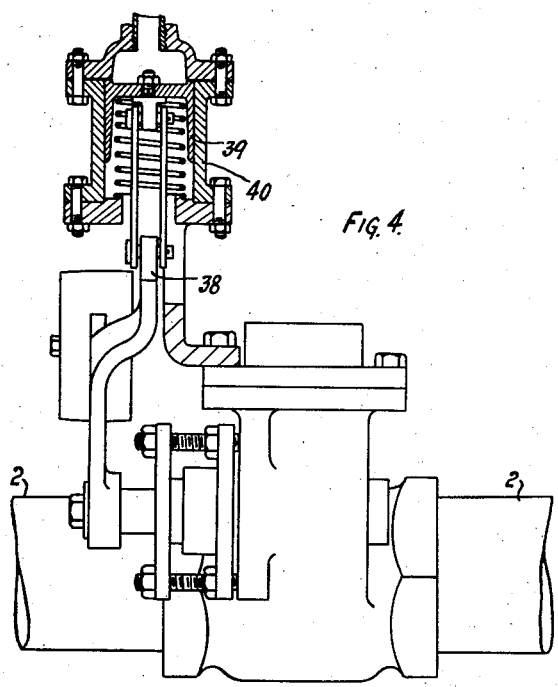
Figure 5:
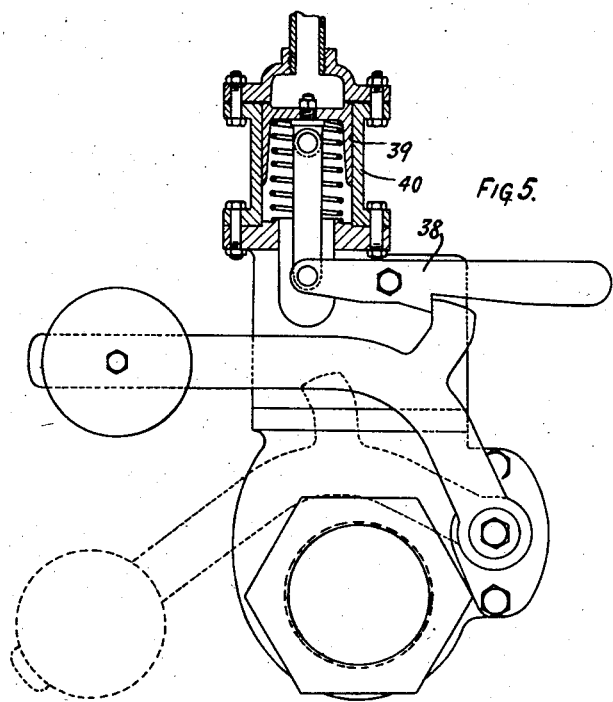

In the accompanying drawings Fig. 1 is a diagrammatic sectional elevation of an apparatus embodying the invention, in which the device for controlling the mixture pressure is set for medium pressure. Fig. 2 is a detached view of said device set for minimum pressure. Fig. 3 is a view showing an automatic device for controlling the pressure. Figs. 4 and 5 are elevations, partly in section, at right angles to each other showing a device for cutting off the gas supply automatically in the event of explosion. Fig. 6 is a fragmentary detail view in section of the controlling diaphragm and chamber.

4 denotes a nozzle to which air under pressure is led through pipe 2.

The nozzle 4 is arranged in alignment with a Venturi-tube 5 in which the air is mixed with gas led through the pipe 3 and from which the mixture passes into a distribution chamber 6 piped to the burners 7.

The admission of air is controlled by a valve 8 located behind the nozzle 4.

Fitted to the gas-supply pipe 2 behind the Venturi-tube 5 is a governor 9 which serves to govern the pressure of the gas on its outlet side so that it is equal to the pressure set up in the pipe 10 leading from the governor to the upper compartment of a diaphragm chamber 14 hereinafter referred to. Fitted in the pipe 2 between the governor outlet and the Venturi-tube 5 is an adjustable obturator 11, the adjustment of which determines the proportions of gas and air in the final mixture, the control of the proportionment being effected on the principle disclosed in the specification of Letters Patent No. 1,250,319.

The regulation of the final pressure of the mixture is determined by the valve 8, it being understood that when the mixture pressure exceeds a predetermined amount the valve 8 is caused to obstruct more or less the passage for the air, resulting in reduction of the pressure in the nozzle 4 and thus neutralizing increase of the pressure in the final mixture, and that in the event of reduction of the mixture pressure due to increased demand, the valve 8 is caused to uncover the air passage until equilibrium is established.

For transmitting movement to the valve 8 there is connected thereto a tubular rod 12 which extends through the Venturi-tube 5 and through the nozzle 4 and which is connected to the controlling diaphragm 13.

The diaphragm 13 is fitted within a chamber 14 the compartment on the underside of which is connected by a tube 15 with the compressed air supply pipe 3, there being a contraction 16 at the junction of the tube 15 and the chamber 14, the air pressure acting on the underside of the diaphragm 13 to hold the valve 8 in raised, that is open, position in opposition to the spring 8'.

At any suitable distance from the diaphragm chamber is a tank 18 which is filled with liquid—say oil—up to the level of an overflow 19. In this tank dips a float chamber 20 closed on top and having an opening at or near the bottom, said float chamber 20 enclosing a float 21 having a stem 22 connected to operate a valve 23 on the top of the float chamber. A tube 24 led to the top of the float chamber 20 connects the said chamber 20 with the underside of the diaphragm chamber 14. Within the tank 18, alongside the float chamber 20, is a displacer 25 fitted with a handle 26 which projects to the outside of the tank 18 and by the manipulation of which the liquid level in the tank 18 may be varied between a fixed minimum and a fixed maximum above the level sufficient to sustain the float 21.

As the float chamber 20 receives compressed air from the diaphragm chamber 14, the pressure in the float chamber 20 rises until the liquid level in the float chamber 20 is depressed below that requisite to sustain the float 21, whereupon the valve 23 begins to open and blow off air, preventing further depression of the liquid level in the float chamber 20.

As evidently the air pressure required to be set up in the float chamber 20 to produce this condition of equilibrium will depend on the liquid level in the tank 18 outside the float chamber 20 as determined by the adjustment of the displacer 25, the invention provides a very accurate and sensitive safety valve device of which the blowing off point can be varied at will, and which cannot be under-loaded or over-loaded.

Alternatively, the liquid level or head in the tank 18 may be varied automatically by employment of a thermostat 27 as shown in Fig. 3. In the arrangement shown in Fig. 3 there is arranged adjacent to the float chamber 20' and desirably enclosed or partly enclosed within the tank 18' a closed vessel 28 the lower end of which is piped to the tank 18' below the liquid level in the latter, and the upper end of which is connected with the compressed air supply pipe 2 by a branch 29 from the tube 15, the branch 29 having a constriction which limits the rate of flow of air. Coupled to the branch 29 is a leakage tube 30 having an outlet controlled by the thermostat 27 and so dimensioned that when the outlet is uncovered by operation of the thermostat with increase of temperature there escapes from the vessel 28 more air than can be replaced by passing through the constriction. As air escapes from the vessel 28, liquid flows into it from the tank 18' until equilibrium is established.

The capacity of the vessel 28 in relation to that of the tank 18' is such that even when the liquid stands at the same level in the closed vessel 28 and in the tank 18', that level will be at the desired minimum height above the level in the float chamber 20' requisite to sustain the float 21'.

To protect the diaphragm 31 of the governor 9 from the consequences of possible explosion, the spindle 32 connected to the diaphragm 31 is led through a floating washer 33 which prevents sudden inrush of gas into the diaphragm chamber 34.

For the like reason, there is fitted at the junction of the pipe 10 and the diaphragm chamber 34 a ball valve 35 arranged to close on sudden surge of pressure along the pipe 10 towards the diaphragm chamber 34.

As an additional safeguard, the valve head of the obturator 11 is preferably slidable on its spindle 36, being normally urged by a spring 37 against a shoulder on the spindle, but movable in opposition to the spring into engagement with its seat when subjected to a heavy surge of back-pressure.

In order to prevent the possibility of an explosion in the upper compartment of the diaphragm chamber 14 and further to protect the diaphragm 13 from the effects of an explosion of the main body of the mixture, a stream of air led from a point between the valve 8 and the nozzle 4 is allowed to flow through the upper compartment of the diaphragm chamber 14 and thence into the distribution chamber 6 by way of a small port fitted with a ball valve 17 which will close on a sudden rush of pressure. For leading the air to the said upper compartment the rod 12 is formed tubular and formed with a port in its lateral wall as indicated at 12', the bore of the rod 12 forming an air conduit which opens at 12² into the upper compartment of the diaphragm chamber 14. The slow passage of air through the upper compartment of the chamber 14 prevents the contents from ever reaching the explosive stage by diffusion, although the compartment is in continuous communication with the distribution chamber 6 by way of the port and therefore the downward pressure on the diaphragm 13 is the same as exists in the distribution chamber 6, As the port 12' is located between the valve 8 and the nozzle 4, the flow of air through the upper compartment of the diaphragm chamber 14 will always be exactly proportionate to the volume of mixture being used, and the regular quality of the mixture will not be affected thereby.

As an additional protection against the consequences of explosion we provide for cutting off the gas entirely when explosion occurs and thus avoid the possibility of mixture continuing to burn inside the piping system or escaping at any point. With this object there is fitted in the gas supply pipe 2 a self-closing valve which is allowed to close on operation of a trip 38 effected by pressure due to an explosion acting on a spring-loaded piston 39 which is movable in a chamber 40 piped to the distribution chamber 6 and which is operatively connected to the trip 38.

What I claim is:—

1. Gas and air mixing apparatus, comprising, in combination, a nozzle, a diffusion tube into which said nozzle opens, a conduit for the passage to said nozzle of one constituent of the gas and air mixture, a conduit for the passage to said tube of the other constituent of the mixture, a governor for governing the pressure of the second constituent, a valve controlling the passage of the first constituent to said nozzle, a diaphragm exposed on one side to regulate fluid pressure and on the other side to the pressure of the mixture, and a rod extending through said tube and connecting said diaphragm with said valve.

2. Gas and air mixing apparatus comprising, in combination, a nozzle, a diffusion tube into which said nozzle opens, a connection for conducting to said nozzle one constituent of the gas and air mixture, a connection for conducting to said tube the other constituent of the mixture, a distribution chamber connected to said tube, a governor for governing the pressure of the second constituent, a valve controlling the passage of the first constituent through said nozzle, a diaphragm chamber having one side in communication with said distribution chamber, a diaphragm in said diaphragm chamber, a connection for pressure fluid to the other side of said diaphragm chamber, and a rod extending through said distribution chamber and said tube and connecting said diaphragm and said valve.

3. Gas and air mixing apparatus comprising, in combination, a nozzle, a diffusion member into which said nozzle opens, a connection for conducting to said nozzle one constituent of the gas and air mixture, a connection for conducting to said diffusion member the other constituent of the mixture, a governor including a chamber and a diaphragm in said chamber for governing the pressure of the constituent conducted by said second connection, a valve controlling the passage of the first constituent through said nozzle, a diaphragm chamber having one side in communication with said diffusion member, a diaphragm in said diaphragm chamber, a tubular connection between said side of said diaphragm chamber and the chamber of said governor, a connection for pressure fluid to the other side of said diaphragm chamber, and an operative connection between said second mentioned diaphragm and said valve.

4. Gas and air mixing apparatus comprising, in combination, a nozzle, a diffusion member into which said nozzle opens, a tubular connection for conducting to said nozzle one constituent of the mixture, a tubular connection for conducting to said diffusion member the other constituent of the mixture, a governor for governing the pressure of the constituent conducted through said second tubular connection, a valve controlling the passage of the first constituent through said nozzle, a diaphragm chamber having one side in communication with said diffusion member, a diaphragm in said diaphragm chamber, a connection between the other side of said diaphragm chamber and the first tubular connection and an operative connection between said diaphragm and said valve.

5. Gas and air mixing apparatus comprising, in combination, a nozzle, a diffusion tube into which said nozzle opens, a connection for conducting to said nozzle one constituent of the mixture, a connection for conducting to said tube the other constituent of the mixture, a distribution chamber connected to said tube, a governor including a chamber and a diaphragm in said chamber for governing the pressure of the constituent conducted by said second connection, a valve controlling the passage of the first constituent through said nozzle, a diaphragm chamber having one side in communication with said distribution chamber, a diaphragm in said diaphragm chamber, a tubular connection between said side of said diaphragm chamber and the chamber of said governor, a connection for pressure fluid to the other side of said diaphragm chamber, and an operative connection between said second diaphragm and said valve.

6. Gas and air mixing apparatus comprising, in combination, a nozzle, a diffusion tube into which said nozzle opens, a connection for conducting to said nozzle one constituent of the mixture, a connection for conducting to said tube the other constituent of the mixture, a distribution chamber connected to said tube, a governor for governing the pressure of the second constituent conducted by said second connection, a valve controlling the passage of the first constituent through said nozzle, a diaphragm chamber having one side in communication with said distribution chamber, a diaphragm in said diaphragm chamber, a tubular connection between said side of said diaphragm chamber and the chamber of said governor, and a rod extending through said distribution chamber and through said tube and connecting said diaphragm and said valve.

7. Gas and air mixing apparatus comprising, in combination, a nozzle, a tubular connection serving to conduct to said nozzle one constituent of the mixture, a tubular connection serving to conduct to said diffusion member the other constituent of the mixture, a governor for governing the pressure of the constituent conducted by said second tubular connection, a valve controlling the passage of the first constituent through said nozzle, a diaphragm chamber having one side in communication with said diffusion member, a diaphragm, in said diaphragm chamber, a float chamber in communication with the other side of said diaphragm chamber, said float chamber having an opening in its bottom wall, a float in said chamber, a tank into which said float dips, means dependent on the position of said float for relieving pressure in said float chamber, and an operative connection between said diaphragm and said valve.

8. Gas and air mixing apparatus, comprising, in combination, a coaxial nozzle and a diffusion tube, a tubular connection serving to conduct to said nozzle one constituent of the mixture, a tubular connection serving to conduct to said tube the other constituent of the mixture, a governor for governing the pressure of the second constituent, a valve controlling the passage of the first constituent through said nozzle, a diaphragm chamber having one side in communication with said tube, a diaphragm in said diaphragm chamber, a float chamber in communication with the other side of said diaphragm chamber, said float chamber having an opening in its bottom wall, a float in said float chamber, a float-controlled blow-off valve fitted to said float chamber, a liquid-containing tank into which said float chamber dips, a displacer in said tank adjustable to vary the blow-off pressure, and an operative connection between said diaphragm and said valve.

9. Gas and air mixing apparatus comprising, in combination, a coaxial nozzle and diffusion tube, a tubular connection serving to conduct to said nozzle one constituent of the mixture, a tubular connection serving to conduct to said tube the other constituent of the mixture, a governor for governing the pressure of the constituent conducted by said second mentioned tubular connection, a valve controlling the passage of the first constituent through said nozzle, a diaphragm chamber having one side in communication with said tube, a diaphragm in said diaphragm chamber, a connection for pressure fluid to the other side of said diaphragm chamber, protecting means for preventing possibility of explosion in the first side of said diaphragm chamber, and an operative connection between said diaphragm and said valve.

10. Gas and air mixing apparatus, comprising, in combination, a diffusion tube, a conduit leading to said tube one constituent of the gas and air mixture, a suction conduit leading to said tube the second constituent of the mixture, a governor for governing the pressure of the second constituent, a valve controlling the admission of the first constituent to said tube, a diaphragm exposed on one side to regulated fluid pressure and on the other side to the pressure of the mixture, and a mechanical connection extending through said tube and connecting said diaphragm with said valve.

11. Gas and air mixing apparatus comprising, in combination, a diffusion tube, an orifice for an inducing medium forming one constituent of the mixture, an orifice for an induced medium forming the other constituent of the mixture, said orifices opening into said tube, separate tubular connections for conducting said media to said orifices, a distribution chamber connected to said tube, a governor for governing the pressure of the induced medium, a valve controlling the passage of the inducing medium through the first orifice, a diaphragm chamber having one side in communication with said distribution chamber, a diaphragm in said diaphragm chamber, a connection for pressure fluid to the other side of said diaphragm chamber, and a rod extending through said distribution chamber and said tube and connecting said diaphragm and said valve.

12. Gas and air mixing apparatus comprising, in combination, a diffusion tube, separate connections for conducting to said tube the constituents of the gas and air mixture, a governor including a chamber and a diaphragm in said chamber for governing the pressure of one constituent, a valve controlling the entrance of the other constituent to said tube, a diaphragm chamber having one side in communication with said diffusion member, a diaphragm in said diaphragm chamber, a tubular connection between said side of said diaphragm chamber and the chamber of said governor, a connection for pressure fluid to the other side of said diaphragm chamber, and an operative connection between said second mentioned diaphragm and said valve.

In testimony whereof I have signed my name to this specification.

GEORGE KEITH.